United States Patent
Piec et al.

(10) Patent No.: US 6,805,928 B2
(45) Date of Patent: Oct. 19, 2004

(54) DECORATIVE COMPONENT FOR USE AS A PIECE OF TRIM OF A VEHICLE

(75) Inventors: Emmanuel Piec, Harnes (FR); Jean-Yves Delattre, Harnes (FR)

(73) Assignee: Visteon System Interieurs, La Defense Cedex (FR)

(*) Notice: Subject to any disclaimer, the term of this patent is extended or adjusted under 35 U.S.C. 154(b) by 64 days.

(21) Appl. No.: 10/384,803

(22) Filed: Mar. 11, 2003

(65) Prior Publication Data

US 2003/0170404 A1 Sep. 11, 2003

Related U.S. Application Data

(60) Continuation-in-part of application No. 09/747,232, filed on Dec. 26, 2000, now Pat. No. 6,623,815, which is a division of application No. 09/568,153, filed on May 10, 2000, now Pat. No. 6,464,917.

(30) Foreign Application Priority Data

May 12, 1999 (FR) .............................. 99 06248

(51) Int. Cl.$^7$ .............................. B60R 13/00
(52) U.S. Cl. .................. 428/31; 428/78; 428/542.2; 428/913.3
(58) Field of Search .................. 428/31.78, 79, 428/542.2, 913.3

(56) References Cited

U.S. PATENT DOCUMENTS

| 4,481,160 A | 11/1984 | Bree |
| 5,558,828 A | 9/1996 | Yada et al. |
| 5,852,854 A | 12/1998 | Pierrot et al. |
| 6,165,404 A | 12/2000 | Savonuzzi |
| 6,464,917 B1 | 10/2002 | Piec et al. |
| 6,623,815 B2 * | 9/2003 | Piec et al. .................. 428/31 |

* cited by examiner

Primary Examiner—Deborah Jones
Assistant Examiner—Abraham Bahta
(74) Attorney, Agent, or Firm—Harrison & Egbert

(57) ABSTRACT

A decorative component for use as a piece of trim including an unlaminated flexible sheet of material having a front face and a back face and a periphery, and a stiffener for fixing a shape of the sheet of material relative to a desired shape of the decorative component. The stiffener is a flexible bead affixed to at least a portion of only the periphery of only the back base of the sheet of material. The front face of the sheet of material is an aspect conferring face.

2 Claims, 2 Drawing Sheets

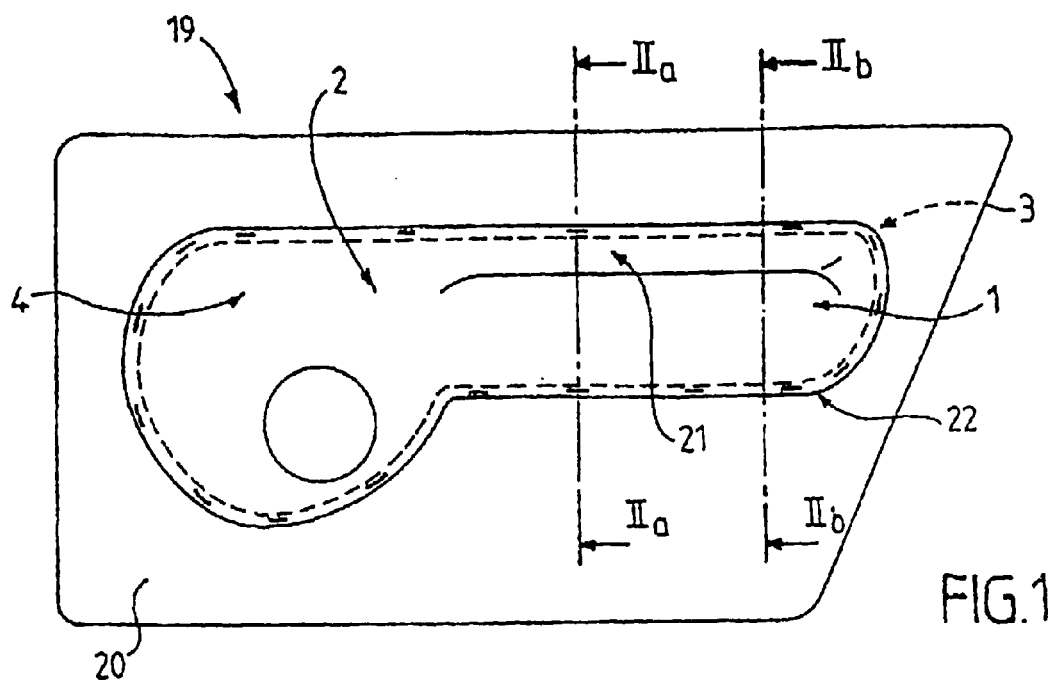
FIG. 1
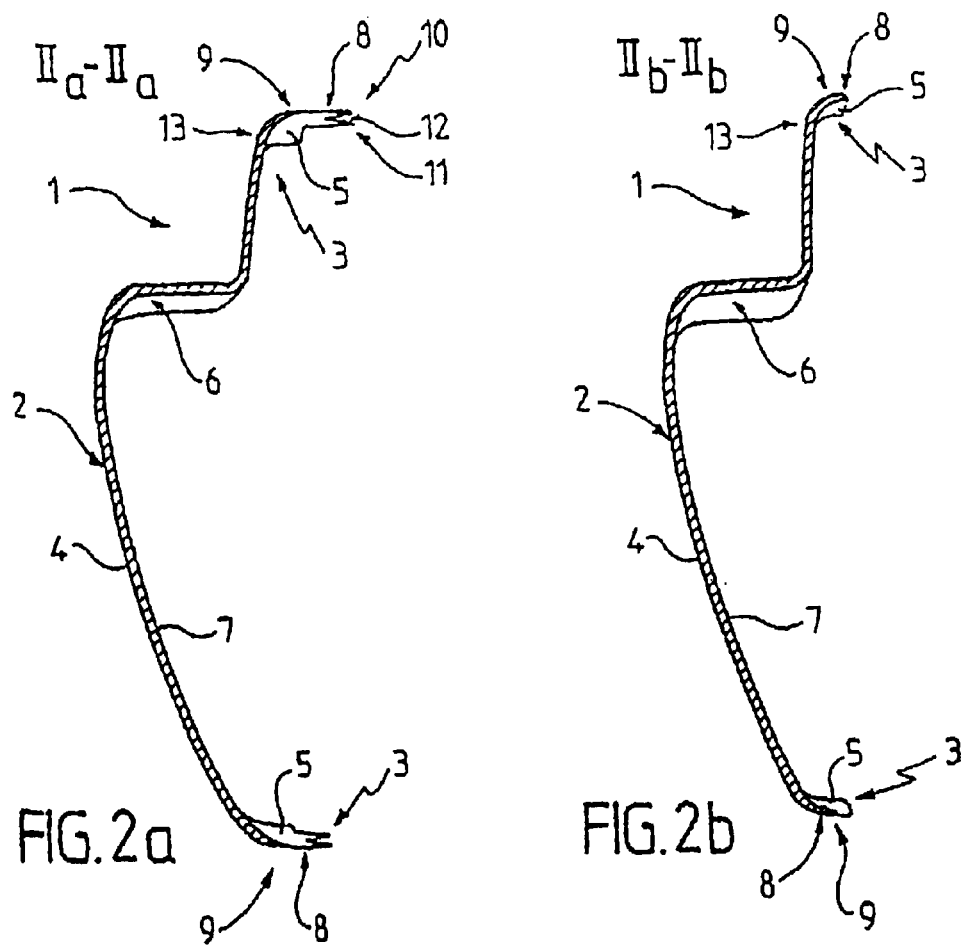

DECORATIVE COMPONENT FOR USE AS A PIECE OF TRIM OF A VEHICLE

RELATED U.S. APPLICATIONS

The present application is a continuation-in-part of U.S. application Ser. No. 09/747,232, filed on Dec. 26, 2000, and entitled "Decorative Component for Use as a Piece of Trim of a Vehicle", now U.S. Pat. No. 6,623,815, which is a divisional of Ser. No. 09/568,153, filed on May 10, 2000, now U.S. Pat. No. 6,464,917.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a decorative component designed, in particular, to be integrated in a piece of internal trim of a vehicle.

BACKGROUND OF THE INVENTION

At the present time, there are known pieces of internal trim for vehicles constituted by a layer of material, referred to as a "carrier", having at least one aspect conferring area formed locally. This aspect conferring area is defined by a component constituted by a sheet of material, which is most often textile. This sheet of material is secured to a stiffening insert provided beneath the entire face of the sheet opposite to its visible face. This component is fixed to the carrier. The two pieces are produced individually and separately in accordance with their desired shapes.

These processes necessitate additional operations on the decorative component. This increases the time taken to manufacture the piece of trim. Furthermore, the component is fixed to the carrier most often by gluing, welding, stapling, clipping and/or screwing. These fixing methods can often prove inadequate. Indeed, when such solutions are adopted, the edges of the component remain fragile and/or creases sometimes appear on its surface. This being the case, in order to avoid having to effect additional operations, processes have been developed whereby the carrier is produced directly beneath the component and placed in a tool designed to mold the carrier. The component is individually formed. The carrier is then produced by injection molding from different points for introduction of the material.

Unfortunately, such solutions lead to the presence of weld marks in areas in which the flows of injected material meet. These weld marks may be partially visible and/or lead to implementation problems. This is because of the high pressures that they may necessitate and which are liable to damage the aspect conferring area. Any steps taken heretofore ensure that the cladding is not wrinkled, does not tear, and is not excessively compressed, and does not give an undesirable shiny appearance.

U.S. Pat. No. 6,165,404, issued on Dec. 26, 2000 to A. Savonuzzi, teaches a method for producing stratiform articles and products. This patent describes an aspect conferring structure for a vehicle. In particular, this patent describes a panel having a core with a decorative surface thereon. The decorative surface is preformed and laminated to the core. In particular, the Savinuzzi process provides at least one preformed laminate comprising the cover layer and a normally solid plastic shielding layer substantially co-extensive with the cover layer. Certain beads are formed on the panel and are integrally formed with the laminated structure. As a result of this laminated structure, the panel will be substantially rigid throughout. The plastic laminate will extend across the entire back face of the aspect conferring sheet.

It is an object of the present invention to provide a decorative component having a sheet within an aesthetic appearance.

It is another object of the present invention to provide a decorative component which facilitates optimum positioning and/or fixing of the sheet of material along its periphery.

It is another object of the present invention to provide a decorative component which minimizes the number of installation operations.

It is another object of the present invention to provide a decorative component which avoids the appearance of weld marks.

It is a further object of the present invention to provide a decorative component which minimizes the pressures required for assembly and manufacture.

It is another object of the present invention to provide decorative component which can save material and can simplify the tools that are required for assembly and manufacture.

It is still a further object of the present invention to provide a decorative component which is relatively inexpensive, easy to manufacture, and easy to use.

These and other objects and advantages of the present invention will become apparent from a reading of the attached specification and appended claims.

BRIEF SUMMARY OF THE INVENTION

The present invention is a decorative component for a use as a piece of trim for a vehicle comprising an unlaminated flexible sheet of material having a front face and a back face and a stiffening means for fixing a shape of the sheet of material relative to a desired shape of the decorative component. The front face has an aspect conferring face. This sheet of material also has a periphery. The stiffening means is a flexible bead affixed to at least a portion of only the periphery and of only the back face of the sheet of material. The bead is either continuous or discontinuous at the periphery. The stiffening mean causes the sheet of material to have a greater rigidity along the periphery than a rigidity interior of the periphery.

At least one block of material is secured to a portion of the sheet of material. This block of material is flexible. The sheet of material has edges secured to a part of the bead. The edges and the bead form a skirt of the decorative component. The present invention also includes positioning means formed in the bead for positioning the decorative component onto the vehicle.

In an alternative embodiment of the present invention, the decorative component for the internal trim of the vehicle is comprised of a decorative component having a flexible unlaminated sheet of material with a front face and a back face, and a carrier having an aspect conferring area. The carrier is connected to the decorative component such that the aspect conferring areas is covered at least partially by the aspect conferring face of the decorative component. The front face of the decorative component is the aspect conferring face. The sheet of material has a periphery. The decorative component includes a stiffening means for fixing a shape of the sheet of material relative to a desired shape of the decorative component. The stiffening means comprises a flexible bead affixed to and extending along at least a portion of only the periphery of the back face of the sheet of material. The stiffening means causes the sheet of material to have a greater rigidity along the periphery than a rigidity interior of the periphery. A groove is formed in the area of contact between the bead and a visible part of the carrier. The sheet of material has an edge inserted into the groove.

BRIEF DESCRIPTION OF THE SEVERAL VIEWS OF THE DRAWINGS

FIG. 1 is a frontal view of piece of trim in accordance with the teaching of the present invention.

FIG. 2a is a partial cross-sectional view across lines $II_a$—$II_a$ of FIG. 1 showing an embodiment of the decorative component according to the present invention.

FIG. 2b is a partially cross-section view taken across lines $II_b$—$II_b$ of FIG. 1 showing another portion of the decorative component.

DETAILED DESCRIPTION OF THE INVENTION

Figure 3:
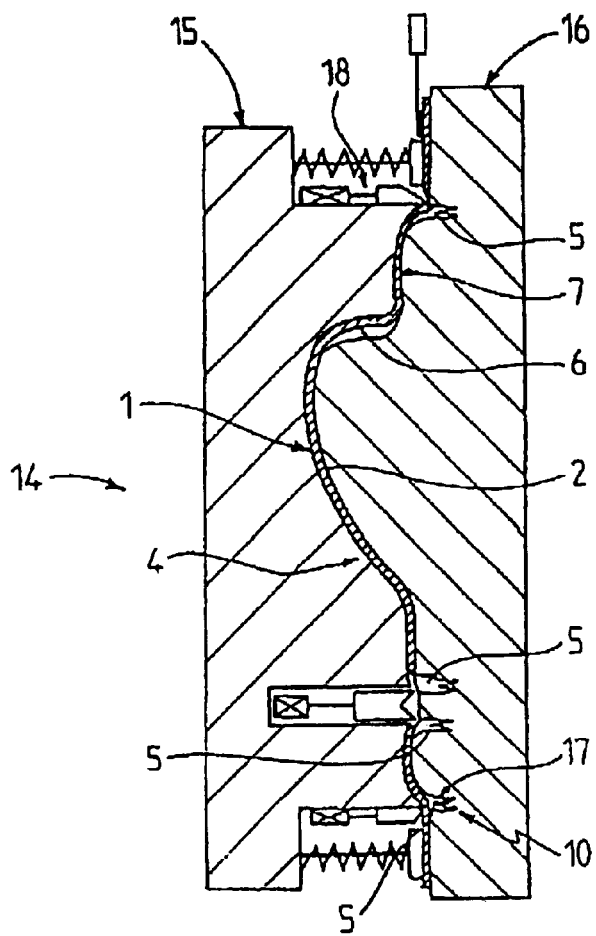
FIG. 3 is a cross-sectional view showing an example of a tool that implements the process of the present invention for the manufacturing of the decorative component shown in FIG. 2.

The invention relates to a decorative component designed to be integrated into a piece of interior trim of a vehicle. The present invention can also be used in association with other types of parts of such a vehicle.

As illustrated in FIGS. 1, 2a and 2b, the decorative component 1 is constituted by at least an unlaminated flexible sheet of material 2 provided with stiffening means 3. The sheet of material further has, at least locally, on one of its faces 4, an aspect conferring face having an aesthetic or comfortable aspect. It is important that the sheet of material 2 be pleasant to the eye and/or touch. This should be true locally in the area of the aspect conferring face 4.

The unlaminated flexible sheet of material 2 is designed so as to be flexible and/or is made of textile materials. The term "flexible" is to be taken as meaning that the sheet of material becomes deformed by its very nature or its consistency, in particular, under its own weight. It cannot, therefore, retain by itself a given shape, or even a contour having a given profile, if it is not supported.

In the present invention, the stiffening means 3 is constituted by a bead 5. The stiffening means serves to fix a shape of the sheet of material relative to a desired shape of a decorative component. The flexible bead 5 is affixed to a least a portion of only the periphery of and only the back face of the sheet of material 2. The bead 5 can be continuous or discontinuous at the periphery. This stiffening means causes the sheet of material 2 to have a greater rigidity along the periphery than a rigidity interior of the periphery. As such, the stiffening means makes it possible to fix the shape according to that desired for the component. It also possible to obtain optimum fixing of sheet of material 2 on its stiffening means 3 without excessive pressure. This fixing is carried out only in the area of the periphery of the sheet where it is necessary, but also sufficient. In addition, when the component is mounted on another piece, the other piece, which is located under the component, can simply have the role of maintaining the shape of the component, without having to necessarily play an additional fixing role. The bead 5 can obviate the need for additional operations during subsequent uses of the component 1 by providing an area for direct assembly of the component 1 to the other part or parts of the piece to be mounted. The bead 5 can, in particular, play the part of a barrier between the flows of material that may be used to form the piece and will then make it possible to prevent the appearance of weld marks. It can also contribute to the tensioning of sheet of material 2 through a pressure of the material on the inner part of the bead. This would be similar to a "piston effect."

The bead 5 is separate from the sheet of material 2. It is constituted by one or more materials different from that or those used to make the sheet.

In a first embodiment of the present invention, the component 1 is substantially flat. The bead 5 is then contained in the plane in which the sheet of material 5 is stretched. In an alternative embodiment, the component can have a profile that is three-dimensional. This three-dimensional profile can be partially recessed and/or in relief. The bead 5 can then follow an irregular path so as to enabling the sheet of material 2 to be given the desired profile or, at the very least, enabling its contour to be fixed along this path. Thus, the sheet will ultimately be able to regain its profile once it is placed opposite a cavity of the same shape. Such a cavity can be, for example, one located in the area of the punch and/or of the die of a mold. The material of the sheet can place itself of its own accord at the desired point because the contour imposed by the bead.

The component 1 can include locally one or more blocks of material 6. These blocks of material 6 can be of a foam material having a certain degree of flexibility and can be secured to the sheet of material 2. The bead 5 is provided only on face 7 of sheet of material 2 opposite its aspect conferring face 4. The same applies, in particular, to any block or blocks of material 6.

The edges of the sheet of material 2 are secured in the area of a part of the bead 5 so as to form a skirt 8 for the component 1. The sheet of material 2 covers, at least partially, the outer lateral face 9 of the bead 5. The component 1 can further include, in the area of bead 5, a means 10 for positioning the component. This means 10 can be continuous or discontinuous.

In a first form of the present invention, the shape imparted to the distal edge 11 of the bead 5 can be beveled or stepped. In another embodiment, the positioning means 10 can be constituted by slots provided in the body of the material in the area of the distal edge 11 of bead 5. These slots 12 are defined in the width of the bead 5, by two facing tabs, spaced apart from one another. As a result of the positioning means 10, the tools used for the assembly of the present invention can be simplified.

It is to be noted that the bead 5 has a proximal edge 13 in contact with the sheet of material 2 opposite the distal edge 11. The lateral face of bead 5 is provided externally between the distal edges 11 and the proximal edges 13 and are covered, at least partially, by the edges of the sheet of material 2.

As shown in FIG. 3, the present invention is formed by a process for manufacturing the decorative component 1. According to this process, the sheet of material 2 is shaped according to a desired profile and the peripheral bead 5 is produced. As a result, it is possible to fix the shape of the profile. These two steps can take place in succession. The forming of the sheet of material 2 can be facilitated on the periphery with the use of a means of assistance such as hold down clamps or a pinning frame, or similar devices. The bead 5 is produced by injection molding and/or extrusion in a mold 14 in which the sheet of material 2 has been preformed. In another form of the present invention, the bead 5 can be produced in advance and then glued to the sheet of material 2. One or more portions of sheet of material 2, extending beyond bead 5, can be cut away. In this way, additional gains in material can be achieved, since cutting can be effected accurately in the area of the bead 5. When the cutting operation is carried out, the edges of the sheet of material 2 can be applied in the area of skirt 8.

To implement such a process, the mold 14 is formed, in particular, by two parts 15 and 16 having the desired profile of the decorative component 1. The parts 15 and 16 are in the area of surfaces of contact. Part 16 of mold 14 is provided with a groove 17 so as to permit the formation of bead 5. The opposite part 15 is provided with the cutting means 18 for cutting the edges of sheet of material.

The following steps are carried out so as to create the decorative component 1. The mold 14 is initially opened and the sheet of material 2 is placed between the parts 15 and 16. The mold 14 can then be closed. The bead 5 is injected under the sheet of material 2. Any excess amounts of the sheet of material are cut off. The mold 14 can then be opened.

Figure 4:
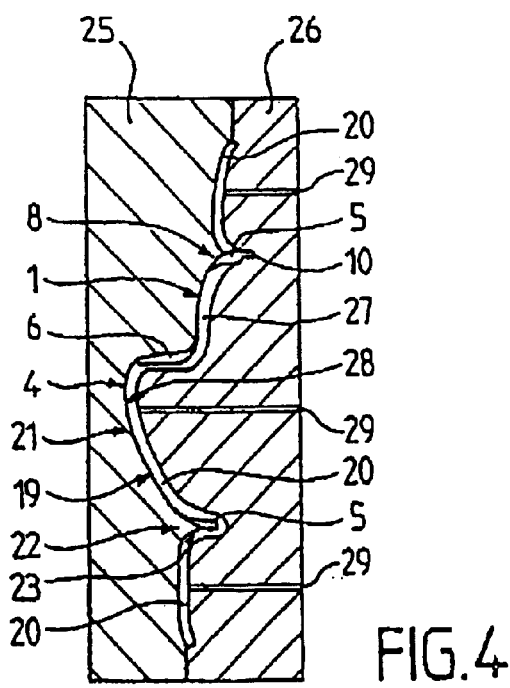
FIG. 4 is a cross-sectional view illustrating an example of a tool for manufacturing the piece of trim shown in FIG. 1.
Figure 5:
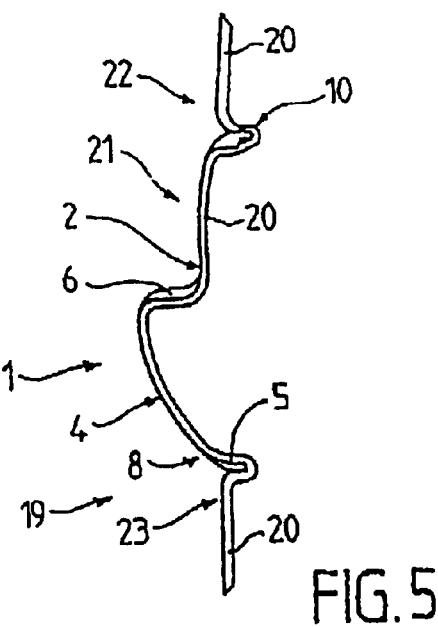
FIG. 5 illustrates a piece of trim obtained in accordance with an alternative embodiment of the process for forming the piece of trim of the present invention.

As illustrated in FIGS. 4 and 5, the present invention also relates to a process for manufacturing a piece of interior trim of a vehicle, for example, a door panel. This piece of trim 19 is constituted by a layer of material 20, referred to as a "carrier" layer. This carrier layer has at least one aspect conferring area 21. In order to manufacture such a piece, a decorative component 1 is produced by using the aforestated manufacturing process. Subsequently, the connection between the carrier 20 and the decorative component 1 is provided in such a way that the aspect conferring area 21 of the piece 19 is defined, at least in part, by the aspect conferring face 4 of the component 1. There is thus produced a piece of trim in which the aspect conferring area is positioned in an optimum manner on carrier 20 by means of the bead 5. This is accomplished without any additional operations and with a reduction of the risk of weld marks appearing between the different parts of the carrier 21. Since the carrier 21 has only the role of positioning and/or maintaining the shape of the sheet of material 2 and does not have the role of fixing the sheet of material 2, the pressures in the tool can be reduced and the risk of damage to the sheet of material is avoided.

The carrier 20 is produced by injection and/or extrusion compression molding, compression molding and/or thermo-compression molding. It is provided beneath the component 1 and defines a frame, or at least partially a frame, around the decorative component 1.

According to an embodiment of the present invention, as is illustrated in FIG. 4, the carrier 20 is secured to the bead 5 in the area of their respective end edges. In another form of the present invention, such as illustrated in FIG. 5, the carrier 20 is over-molded above distal edge 11 of the bead 5. In this way, the connection is ensured between the component 1 and the carrier 20 at least in the area of bead 5 of the component 1.

In one particular form of the present invention, a groove 22 is formed in the area of a zone of contact between the bead 5 and a visible part of the carrier 20. The edge of the sheet of material 2 is provided so as to be inserted into the groove 22. In this way, the finish of the piece of trim is further improved. The groove 22 is produced by providing a skirt 23 on carrier 20 facing the skirt 8 on component 1. The relative positioning of component 1 in the piece of trim 19 can be ensured by means of the bead 5, in particular, as provided with the positioning means 10. If blocks 6 of material are used, these are fixed to the sheet of material 2 during the first step in which the mold 14 is used to manufacture decorative component 1.

In order to implement the process for manufacturing the piece of trim 19, use can be made of a second mold 2 having two parts 25 and 26 between which a gap 27 is defined so as to produce carrier 20. One part 26 of the second mold 24 has, in the area of gap 27, a cavity 28 in which the decorative component 1 is place. Its profile matches that imparted to sheet of material 2 in the mold 14. Different points of injection 29 are provided on the other part 26 of the second mold 24. These points of injection 29 can be provided opposite cavity 28 for forming the part of carrier 20 located beneath the component 1 and for the forming the rest of the carrier 20. In the area of the portion 26 having injection points 29, positioning grooves can be provided so as to cooperate with the slots 12 of component 1.

In order to obtain the piece of trim 19, the following steps are carried out. A decorative component 1 is manufactured in a mold 14, as described above. The other mold 24 is opened and the component 1 is placed in the cavity 28. The second mold 24 is closed and the carrier 20 is injected both between the component 1 and around it, possibly sequentially. The second mold 24 is cooled down so that it can finally be opened so that the formed item 19 can be stripped therefrom. The first and second steps can be carried out in "hidden time," possibly in the same tool, such as a multiple mold.

In the present invention, the stiffening means is able to confer the unlaminated flexible sheet with the desired configuration for the attachment to a vehicle as a decorative component. It is not necessary to carry out laminating procedures. In fact, the decorative component is quite flexible and pliable. The decorative component will achieve its desired shape when fastened to the trim of the vehicle and will be rigidly maintained in place. The beads include positioning elements formed therein so as to allow for snap-fit engagement of the decorative component to the vehicle.

A unexpected benefit of the present invention is the result of the use of this peripheral bead. The central part, interior of the bead, is free and can be formed. It does not create any problems since the peripheral bead fixes the desired profile. The central part of the material recovers its desired profile when installed on the vehicle. The bead defines the affixation zone upon which the decorative component can be attached. As a result, it is unlikely that the decorative portion will be damaged during the formation of the vehicle panel.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A decorative component for use as a piece of trim of a vehicle, the decorative component comprising:

an unlaminated flexible sheet of material having a front face and a back face, said front face being an aspect conferring face, said sheet of material having a periphery; and a stiffening means for fixing a shape of said sheet of material relative to a desired shape of the decorative component, said stiffening means comprising a flexible bead affixed to at least a portion of only said periphery of only said back face of said sheet of material, said bead being continuous or discontinuous at said periphery, said stiffening means for causing said sheet of material to have a greater rigidity along said periphery than a rigidity interior of said periphery.

2. A decorative article for internal trim of a vehicle comprising:

a decorative component having a flexible sheet of material with a front face and a back face, said front face being an aspect conferring face, said sheet of material having a periphery, said decorative component having a stiffening means for fixing a shape of said sheet of material relative to a desired shape of said decorative component, said stiffening means comprising a flexible bead affixed to and extending along at least a portion of only said periphery of said back face of said sheet of material, said stiffening means for causing said sheet of material to have a greater rigidity along said periphery than a rigidity interior of said periphery; and a carrier having an aspect conferring area, said carrier being a layer of material, said carrier being connected to said decorative component such that said aspect conferring area is covered at least partially by said aspect conferring face of said decorative component.

* * * * *